United States Patent [19]

Carpenter

[11] Patent Number: 4,569,395

[45] Date of Patent: Feb. 11, 1986

[54] MATRIX CONTROL CEMENTING SLURRY

[75] Inventor: Robert B. Carpenter, Mansfield, Tex.

[73] Assignee: Hughes Tool Company, Houston, Tex.

[21] Appl. No.: 602,641

[22] Filed: Apr. 20, 1984

[51] Int. Cl.$^4$ ............................................. E21B 33/13
[52] U.S. Cl. ................................. 166/293; 166/294; 106/314; 523/130; 525/60
[58] Field of Search .................... 166/285, 292–295; 523/130; 525/60; 106/90, 314

[56] References Cited

U.S. PATENT DOCUMENTS

| | | | |
|---|---|---|---|
| 2,252,271 | 8/1941 | Mathis | 252/8.5 |
| 2,294,294 | 8/1942 | Grebe | 166/22 |
| 2,819,239 | 1/1958 | Eberhard | 260/29.6 |
| 3,409,080 | 11/1968 | Harrison | 166/31 |
| 3,421,584 | 1/1969 | Eilers et al. | 523/130 |
| 3,491,049 | 1/1970 | Gibson | 260/29.2 |
| 3,511,314 | 5/1970 | Scott, Jr. | 166/293 |
| 3,605,897 | 9/1971 | Crinkelmeyer | 166/291 |
| 3,645,763 | 2/1972 | Ronzio et al. | 106/90 |
| 3,915,919 | 10/1975 | Nishioka et al. | 106/90 |
| 4,119,597 | 10/1978 | Enoue | 106/90 |
| 4,258,790 | 3/1981 | Hale | 166/283 |
| 4,462,837 | 7/1984 | Baker et al. | 166/293 |

*Primary Examiner*—Stephen J. Novosad
*Assistant Examiner*—Bruce M. Kisliuk
*Attorney, Agent, or Firm*—Robert A. Felsman; Charles D. Gunter, Jr.

[57] ABSTRACT

A well cementing composition and method are shown in which a hydraulic cement, water, and a heat actuated matrix control admix are mixed together to provide a cement slurry composition having improved cementing characteristics over a broad temperature range. The admix contains a polyvinyl acetate-polyvinyl alcohol polymer which is insoluble in the slurry composition at ambient temperatures and which has greater than about 95% acetate groups converted to hydroxyl groups. As the circulating temperature rises in the range from about 90° to 140° F., the polymer begins to solubilize and gradually thickens the slurry to combat thermal thinning, fluid loss and settling. A companion cellulosic fluid loss material can be utilized, which is soluble in the slurry at ambient temperatures, to provide initial fluid loss control.

6 Claims, No Drawings

MATRIX CONTROL CEMENTING SLURRY

BACKGROUND OF THE INVENTION

1. Field of the Invention

This invention relates generally to well cementing compositions and methods and, specifically, to a dry admix for such compositions for achieving matrix control and zonal isolation through improved bonding, fluid loss control, reduced stratification of solids, decreased permeability, and increased filtrate viscosity.

2. Description of the Prior Art

Cement compositions are used in the oil and gas industry to cement the annular space in the well bore between the surrounding formation and pipe or casing. Typically, the cement slurry is pumped down the inside of the casing and back up the outside of the casing through the annular space. The slurry is allowed to set up or harden in the annular space, thereby forming a rigid column which ideally forms a bond with the earth formation as well as with the metal pipe. To achieve a satisfactory primary cementing job, it is important to achieve a tight bond to prevent vertical communication of fluids or gas along or within the column, which could contaminate the producing zone, or permit a loss of reserves.

Adequate fluid loss control is also important in achieving effective primary cementing. Inadequate fluid loss control can result in the formation of a bridge in the annulus opposite a permeable zone, thus isolating a lower zone from the hydrostatic pressure above the bridge. Only a small amount of filtrate loss beneath such a bridge is then necessary to drop the annular pressure to beneath that of the formation pressure. The result is an influx of formation fluids and pressure, creating flow channels and the need for expensive remedial work.

In attempting to control fluid loss from the cementing slurry to the surrounding formation, it is important to reduce the cement matrix permeability and retain water during the initial set, effectively blocking the porous cement structure. One way to do this is to reduce filtrate mobility by increasing the filtrate viscosity to counter the normal thermal thinning of the cement slurry which occurs at down hole temperatures. An increase in filtrate viscosity at down hole temperatures minimizes thermal thinning and increases the retention of the filtrate within the cement matrix. Conventional fluid loss polymers do not effectively counteract thermal thinning with increased temperature thereby allowing fluid loss to the formation and promoting stratification of solids within the cement column.

In order to lessen the loss of fluid from the aqueous cement slurry, various materials have been employed in the past. At lower temperatures, cellulosic materials such as methyl cellulose, carboxymethyl cellulose, hydroxymethyl cellulose, and the like, have proved to be effective. As temperatures in the well bore increase with depth, other types of synthetic polymers have been utilized. The use of polyamine compounds is taught, for instance, in U.S. Pat. No. 3,491,049, to Gibson et al, issued Jan. 20, 1970. However, polyamines do not generally function as fluid loss additives when used alone but must be used with a companion material, typically one of the so-called "dispersant" materials. The Gibson et al patent teaches the use of a sulfonated naphthalene condensate dispersant as an additional additive to the cement slurry which cooperates with the polyamine additive to provide satisfactory fluid loss in cement slurries used at about 200° F. and below. The sulfonated naphthalene dispersant is typically a low molecular weight material, e.g., in the range from about 1,000 to 3,000.

Sulfonated polystyrene has also been used in the past as a fluid loss additive for cement compositions. U.S. Pat. No. 3,234,154 to Martin, issued Feb. 8, 1966, teaches the use of a sulfonated polystyrene polymer having a molecular weight in the range of 300,000 to 4,000,000. The sulfonated polystyrene is used in conjunction with a lignin amine derivative.

U.S. Pat. No. 3,409,070 to Harrison, issued Nov. 5, 1968, mentions that polyvinyl alcohol and polyvinyl acetate can be used as polymeric fluid loss agents in oil well cements. The particular type of polyvinyl alcohol utilized is not stressed and the example given in the patent uses a polyvinyl alcohol which is 88% hydrolyzed. It is also applicant's understanding that the polyvinyl alcohol polymers used as fluid loss agents in the past were always soluble in the cement slurry at ambient temperatures.

SUMMARY OF THE INVENTION

Applicant has discovered that a particular class of polyvinyl acetate-polyvinyl alcohol polymer provides unique advantages in cement matrix control over a temperature range from ambient to about 300° F. The polyvinyl acetate-polyvinyl alcohol polymer utilized is insoluble in an aqueous cement slurry at ambient temperatures. The polymer has greater than about 95% acetate groups converted to hydroxyl groups. The polymer is heat actuable to solubilize in the cement slurry at temperatures above about 120° F. in laboratory tests.

The polyvinyl acetate-polyvinyl alcohol polymer of the invention is utilized in a cement slurry containing a hydraulic cement and water in an effective amount to produce a pumpable slurry. The polymer is preferably supplied in the form of a dry admix which also includes a companion cellulosic fluid loss material which is soluble in the slurry composition at ambient temperatures and a sulfonated naphthalene dispersant type material. The aqueous cement slurry containing the admix of the invention is pumped to the desired location in the well bore and allowed to harden to a solid mass. The polyvinyl acetate-polyvinyl alcohol polymer solubilizes slowly with gradually increasing temperature and serves to counteract the thermal thinning effect which occurs with standard fluid loss additives. As as result, the cement slurry has a stable viscosity at temperatures in the range of 80° F.–250° F. and even greater. Additional objects, features and advantages will be apparent in the written description which follows.

DETAILED DESCRIPTION OF THE INVENTION

The well cementing compositions of the invention include water, a hydraulic cement, and a matrix control admix. The term "hydraulic cement" is meant to encompass any inorganic cement which hardens or sets under water. Hydraulic cements, for example, include Portland Cement, aluminous and pozzolan cement, and the like. The term is also intended to include cements having extenders such as bentonite, silicates, gilsonite, and also is intended to include cements used either without any appreciable sand or aggregate material, or such cements admixed with a granular filling material, such as sand, ground limestone and the like. Thus, for example, any of the Class "A-H" and "J" and lightweight cements, as listed in the "API Spec. 10 First Edition, January, 1982", are suitable for this purpose. Strength enhancers such as silica powder can also be employed.

Mixing water is utilized with the dry cement composition to produce a fluid pumpable slurry of suitable consistency. The amount of water used can vary over a wide range dependent upon the consistency of the slurry required, the strength requirement for the particular job, and other factors. API Spec. 10, which is known in the cement industry, describes an apparatus and method for measuring the consistency of cement slurries in terms of Bearden units of consistency (Bc). A pumpable slurry should measure in the range of about 2-20 Bc, and preferably be in the range of 5 to 11 Bc. Slurries thinner than 5 Bc will tend to have greater particle settling, and free water generation. Slurries thicker than about 11 Bc become increasingly difficult to pump.

Depending upon the particular slurry and intended conditions of use, mixing water is utilized in the slurry of the present invention in the range from about 30 to 130 weight percent based upon the weight of dry cement, and preferably in the range of 35 to 100 weight percent.

The present cement compositions, in addition to hydraulic cement and water in a sufficient amount to produce a pumpable slurry, include a matrix control admix. The matrix control admix of the invention is a dry powder or granular material and includes, as one component, a particular class of polyvinyl acetate-polyvinyl alcohol polymer. Methods of producing polyvinyl acetate-polyvinyl alcohol polymers are known to those skilled in the art. U.S. Pat. Nos. 1,676,156, 1,971,951, and 2,109,883, as well as various literature references describe these types of polymers and their preparation. Among the literature references are "Vinyl Polymerization", Vol. 1, Part 1, by Ham, published by Marsell Dekker, Inc., (1967) and "Preparative Methods of Polymer Chemistry", by Sorenson and Campbell, published by Interscience Publishers, Inc., New York (1961).

In general, polyvinyl acetate in an alcohol solution can be converted to polyvinyl alcohol, i.e. —OCOCH$_3$ groups are replaced by —OH groups through "hydrolysis", also referred to as "alcoholysis". The ratio of polyvinyl acetate to polyvinyl alcohol depends upon the extent to which the acetate groups have undergone hydrolysis during the polymerization have been converted to hydroxyl groups. The extent of hydrolysis can range from 1% to 100% wherein substantially all of the acetate groups have been converted to hydroxyl groups. Certain "super-hydrolyzed" grades are also available.

Polyvinyl acetate-polyvinyl alcohol latices commercially available are usually described as partially, intermediately, fully and super-hydrolyzed, depending upon the percent of hydrolysis achieved during the polymerization and the molecular weight of the resulting polymer. Generally speaking, the higher the degree of hydrolysis and higher the molecular weight, the lower the water solubility of the polymer. Partially hydrolyzed polymers are from about 87.0-89.0% hydrolyzed; intermediately hydrolyzed polymers are from about 95.5-96.5% hydrolyzed; fully hydrolyzed polymers are from about 98.0-98.8% hydrolyzed, and superhydrolyzed polymers are from about 99.7-100.0% hydrolyzed. In a similar fashion, the molecular weight of the resulting polymer ranges from about 22,000 to 31,000 for the partially hydrolyzed polymers, 77,000 to 79,000 for the intermediately hydrolyzed polymers, 80,000 to 120,000 for the fully hydrolyzed polymers, and greater than 110 to 120,000 for the superhydrolyzed polymers.

For purposes of the present invention, suitable polyvinyl acetate-polyvinyl alcohol polymers must have greater than about 95% acetate groups converted to hydroxyl groups whereby the resulting polymer is substantially insoluble in an aqueous cement slurry at ambient temperatures. Preferably, the polymer utilized is fully hydrolyzed having greater than about 98% hydrolysis and with a resulting molecular weight of about 100,000 or greater. The preferred polymers are insoluable in an aqueous cement slurry at ambient temperatures but are heat actuable at formation temperatures and begin to solubilize in the cement slurry at temperatures above about 90°-120° F. In laboratory tests, the preferred polymers begin to solubilize in the range of about 120°-140° F. In field use, some increase in cement slurry viscosity has been observed at as low as 100° F. due to increased shear in mixing the slurry, especially where weighting materials are utilized in the slurry. In any case, the preferred polymers are insoluable in cement slurries at ambient temperatures but begin to slowly dissolve to counteract thermal thinning as temperatures increase.

A preferred polyvinyl acetate-polyvinyl alcohol material can be obtained commercially from Air Products and Chemicals, Inc., under the trademark "Vinol 350", and is a fully hydrolyzed polymer having a 98.0-98.8% hydrolysis, a high viscosity (55-65 cps), a ph of 6-8, and having 5% maximum volatiles and 1.0% maximum ash. The polymer of the invention is present in the dry admix in the range from about 30 to 70 weight percent based upon the dry weight of the admix, preferably about 50 weight percent.

The dry admix also preferably includes a companion fluid loss material which is soluble in the aqueous cement slurry at ambient temperatures, i.e., 60°-90° F. Known fluid loss additives utilized in cement compositions include cellulosic materials, polysaccharides, polyacrylamides, polyacrylonitrile, polymethacrylates, polyamines, and polyvinylpyrrolidone. Cellulosic fluid loss materials can be selected from the group consisting of: methyl cellulose, carboxymethyl cellulose, hydroxymethyl cellulose, carboxymethylhydroxyethyl cellulose, natural starches and mixtures thereof.

The preferred fluid loss material is a blend of a cellulosic polymer, polyvinylpyrrolidone, a "dispersant-type material" and a minor amount of fumed silica.

By "dispersant" material is meant an anionic surface active agent of the sulfonated naphthalene type. Such materials are typically lower molecular weight materials, with molecular weights ranging from about 1,000 to 3,000. A 95% active powder is available under the trademark "Nopcosant" and is known in the industry.

The preferred fluid loss blend contains hydroxyethyl cellulose in the range from about 15 to 30%, sulfonated naphthalene dispersant in the range from about 15 to 25 weight percent, polyvinylpyrrolidone in the range from about 2 to 10 weight percent, and less than about 1% fumed silica, all weights based upon the weight of dry admix. Most preferably, the fluid loss blend contains about 25 weight percent hydroxyethyl cellulose, about 20 weight percent sulfonated naphthalene dispersant, about 5 weight percent polyvinylpyrrolidone, and less than 1% fumed silica.

The preferred matrix control admix contains about 50 weight percent polyvinyl acetate-polyvinyl alcohol polymer and about 50 weight percent fluid loss blend as described, all weight percents based upon the total dry weight of matrix control admix.

In the method of cementing a well bore with the matrix control admix, a hydraulic cement, water and the admix are mixed together to form a pumpable slurry. The admix is present in the range from about 0.5 to 4.0 weight percent based upon the dry weight of cement, and preferably is present in the range from about 1.0 to 2.2 weight percent to achieve fluid loss results of less than about 100 cc. per 30 minutes at temperatures ranging from about 140° to 250° F. Since the matrix control admix is a dry product, it can be present in the dry cement blend on the shelf, or can be added to the mixing vessel at the well site. The cement slurry so prepared is then pumped to the desired location in the well bore and allowed to harden to form a solid mass.

The following examples are intended to be illustrative of the invention:

EXAMPLE

A matrix control admix containing 50% VINOL 350 polyvinyl acetate-polyvinyl alcohol polymer, 24.93% hydroxyethyl cellulose, 19.94% sulfonated naphthalene dispersant, 4.98% polyvinylpyrrolidone, and 0.15% fumed silica was dry blended. All percentages are weight percents, based upon the dry weight of matrix control admix.

A number of exemplary cement slurries were then formed using the dry matrix control admix, Trinity Class H cement, water and various conventional cement additives. The admix was utilized in the cement slurries in the range from about 1.3 to 2.2 weight percent, based upon the dry weight of cement. One sack of cement contains approximately 94 pounds of cement. The cement mix 1:0:0 refers to one sack of cement, 0 sacks of diamix, and 0% bentonite. A conventional fluid loss additive was prepared for comparison purposes in certain of the tests which follow, containing about 50% hydroxyethyl cellulose, about 40% sulfonated naphthalene dispersant, about 9% polyvinylpyrrolidone and less than about 1% fumed silica. All weight percents are based upon the dry weight of fluid loss additive prepared.

The bond strength, consistency, free water and fluid loss tests which follow were performed in accordance with the standard procedures contained in the "API Spec. 10, First Edition, January 1982." The results are shown in the tables which follow:

The nitrogen break-through rates were determined at the end of the conventional API fluid loss tests by recording the nitrogen escaping a Baroid test cell in standard cubic feet (SCF) per hour. The results were determined with 1,000 psi of nitrogen pressure on the test cell, 10 minutes after initial break-through or dehydration.

The following abbreviations are used in the tables which follow:

| ABBREVIATION | MEANING |
| --- | --- |
| FLA | conventional fluid loss additive |
| MCA | matrix control admix of the invention |
| R-1 | sodium lignosulfonate retarder |
| R-11 | blended high temperature retarder material |
| D-8 | silica flour |

TABLE 1

CEMENT BOND STRENGTH (7 DAYS AT 200° F.)

| cement mix | additive | Bond strength, lb |
| --- | --- | --- |
| class H cement 4.28 gal fresh water per sack cement | | Density 16.5 lb/gal Yield: 1.05 cu.ft/sack |
| 1:0:0 | + 1.5% MCA | 1550 |
| 1:0:0 | + 1.0% FLA | 850 |

TABLE 2

| cement mix | additive | Consistency, BC 0° | Final | API fluid loss, ml/30 min | Temperature, 0° F. |
| --- | --- | --- | --- | --- | --- |
| class H cement 4.28 gal fresh water per sack cement | | | | Density: 16.5 lb/gal Yield: 1.05 cu.ft/sack | |
| 1:0:0 | + 1.3% MCA | 8 | 7 | 126 | 140 |
| 1:0:0 | + 1.5% MCA | 9 | 8 | 58 | 140 |
| 1:0:0 | + 1.7% MCA | 10 | 8 | 36 | 140 |
| 1:0:0 | + 1.3% MCA | 8 | 8 | 108 | 167 |
| 1:0:0 | + 1.5% MCA | 9 | 9 | 72 | 167 |
| 1:0:0 | + 1.7% MCA | 10 | 11 | 42 | 167 |
| 1:0:0 | + 1.3% MCA | 8 | 8 | 339 | 197 |
| 1:0:0 | + 1.5% MCA | 9 | 9 | 192 | 197 |
| 1:0:0 | + 1.7% MCA | 10 | 10 | 70 | 197 |
| 1:0:0 | + 1.5% MCA + 0.2% R-1 | 10 | 10 | 30 | 197 |
| 1:0:0 | + 1.7% MCA + 0.2% R-1 | 11 | 10 | 36 | 215 |

TABLE 3

NITROGEN BREAK-THROUGH RATES

| cement mix | additive | API fluid loss, ml/30 min | Nitrogen flow rate, std.cu. ft./hr | Temperature, 0° F. |
| --- | --- | --- | --- | --- |
| class H cement 4.28 gal fresh water per sack cement | | | Density: 16.5 lb/gal Yield: 1.05 cu.ft/sack | |

TABLE 3-continued

NITROGEN BREAK-THROUGH RATES

| cement mix | additive | API fluid loss, ml/30 min | Nitrogen flow rate, std.cu. ft./hr | Temperature, 0° F. |
| --- | --- | --- | --- | --- |
| 1:0:0 | + 1.0% FLA | 45 | 1.1 | 167 |
| 1:0:0 | + 1.5% MCA | 79 | <0.1 | 167 |
| 1:0:0 | + 1.0% FLA | 108 | 0.2 | 197 |
| 1:0:0 | + 1.7% MCA | 70 | <0.1 | 197 |
| 1:0:0 | + 0.85% FLA + 0.2% R-1 | 140 | 3.0 | 197 |
| 1:0:0 | + 1.7% MCA + 0.2% R-1 | 30 | <0.1 | 197 |

TABLE 4

RHEOLOGY AND FREE WATER TESTS

| cement mix | additive | Temperature, °F. | Consistency, BC 0' | Final | Fann 35 readings 600 | 300 | 200 | 100 | Free water ml |
| --- | --- | --- | --- | --- | --- | --- | --- | --- | --- |
| | class H cement 4.28 gal fresh water per sack cement | | | | Density: 16.5 lb/gal Yield: 1.05 cu.ft/sack | | | | |
| 1:0:0 | + 1.3% MCA | 80 | 8 | 8 | 134 | 74 | 51 | 29 | 18 |
| | | 140 | 8 | 7 | 113 | 65 | 40 | 20 | 0 |
| | | 167 | 8 | 8 | 141 | 75 | 51 | 28 | 0 |
| | | 190 | 8 | 8 | 192 | 108 | 72 | 44 | 0 |
| 1:0:0 | + 1.5% MCA | 80 | 9 | 9 | 322 | 186 | 132 | 65 | 12 |
| | | 140 | 9 | 8 | 194 | 106 | 72 | 38 | 0 |
| | | 167 | 9 | 9 | 293 | 168 | 120 | 67 | 0 |
| | | 190 | 9 | 9 | 310 | 196 | 124 | 70 | 0 |
| 1:0:0 | + 1.7% MCA | 80 | 10 | 10 | 420 | 234 | 160 | 84 | 12 |
| | | 140 | 10 | 8 | 345 | 184 | 124 | 66 | 0 |
| | | 167 | 10 | 11 | 268 | 160 | 112 | 62 | 0 |
| | | 190 | 10 | 10 | 266 | 150 | 106 | 58 | 0 |
| 1:0:0 | + 1.5% MCA + 0.2% R-1 | 80 | 10 | 11 | 354 | 204 | 136 | 80 | 14 |
| | | 190 | 10 | 10 | 120 | 66 | 46 | 25 | 0 |
| 1:0:0 | + 1.7% MCA + 0.2% R-1 | 80 | 11 | 11 | 440 | 250 | 178 | 106 | 13 |
| | | 190 | 11 | 10 | 332 | 186 | 130 | 70 | 0 |
| | class H cement 5.66 gal fresh water per sack cement | | | | Density: 16.2 lb/gal Yield: 1.44 cu.ft/sack | | | | |
| 1:0:0 | + 35% D-8 + 1.9% MCA + 0.2% R-1 | 80 | 10 | 11 | 497 | 262 | 198 | 98 | 16 |
| | | 190 | 10 | 9 | 280 | 150 | 104 | 54 | 0 |
| 1:0:0 | + 35% D-8 + 2.2% MCA + 0.3% R-11 | 80 | 11 | 13 | 574 | 316 | 216 | 108 | 12 |
| | | 190 | 11 | 12 | 209 | 116 | 80 | 44 | 0 |

An invention has been provided with significant advantages. The cement matrix control admix of the invention is a single product with several advantages for improved primary well cementing. The fluid loss and thickening times of cement slurries prepared with the admix are very even over a broad temperature range. These characteristics of the cement slurries of the invention provide consistent results and are little effected by variations in actual down hole temperature. The slurries of the invention have improved interfacial bonding between the formation and pipe or casing. The slurries are also characterized by excellent fluid loss control, decreased cement permeability and increased filtrate viscosity. The slurries of the invention have minimal free water and density stratification at down hole temperatures. The use of the matrix control admix of the invention provides a cement slurry which is less damaging to surrounding formations than conventional drilling muds or slurries containing conventional fluid loss additives.

While the invention has been shown in only one of its forms, it is not thus limited, but is susceptible to various changes and modifications without departing from the spirit therof.

I claim:

1. A method of cementing a well bore, comprising the steps of:

mixing together at ambient temperatures at the well surface a hydraulic cement, water in an effective amount to produce a pumpable slurry, and a polyvinyl acetate-polyvinyl alcohol polymer which is insoluble in the slurry at ambient temperatures, said polymer having greater than about 95 percent acetate groups converted to hydroxyl groups, said polymer being heat actuable to solubilize in said cement slurry at temperatures above about 120° F.; and solubilizing said polyvinyl acetate-polyvinyl alcohol polymer in said slurry prior to the setting of said slurry by pumping said cement slurry to a desired location in the well bore and thereby increasing the temperature of said slurry; and allowing said cement slurry to harden to a solid mass.

2. The method of claim 1, further comprising the steps of;

adding hydroxyethyl cellulose and a sulfonated naphthalene dispersant type material to said slurry prior to pumping said slurry into said well bore.

3. A method of cementing a well bore, comprising the steps of:

mixing together at ambient temperatures at the well surface a hydraulic cement, water in an effective amount to produce a pumpable slurry, and a heat actuated matrix control admix to provide a cement slurry composition having API fluid loss of under 100 milliliters in 30 minutes at temperatures in the range of 140° F. to 250° F., said admix comprising a polyvinyl acetate-polyvinyl alcohol polymer which is insoluble in said slurry composition at ambient temperatures and which has greater than about 98 percent acetate groups converted to hydroxyl groups, said polymer being heat actuable to solubilize in said slurry composition to provide fluid loss control at temperatures above about 120° F., and said admix having a companion cellulosic fluid loss material for said polymer which is soluble in said slurry composition at ambient temperatures;

solubilizing said polyvinyl acetate-polyvinyl alcohol polymer in said slurry prior to the setting of said slurry by pumping said cement slurry to a desired location in the well bore and thereby increasing the temperature of said slurry; and allowing said cement slurry to harden to a solid mass.

4. The method of claim 3, wherein said companion material is selected from the group consisting of methylcellulose, hydroxyethyl cellulose, carboxymethyl cellulose, carboxymethylhydroxyethyl cellulose, natural starches, and mixtures thereof.

5. The method of claim 4, further comprising the step of adding a sulfonated naphthalene dispersant material to said slurry composition.

6. The method of claim 5, wherein said admix used in said mixing step is a dry blend comprising:

about 50 weight percent polyvinyl acetate-polyvinyl alcohol polymer, about 25 weight percent hydroxyethyl cellulose about 20 weight percent sulfonated naphthalene dispersant, and about 5 weight percent polyvinylpyrrolidinone.

* * * * *